US012381052B2

(12) United States Patent
Fanta et al.

(10) Patent No.: US 12,381,052 B2
(45) Date of Patent: Aug. 5, 2025

(54) VACUUM INTERRUPTER ANTI-BOUNCE DAMPENER

(71) Applicant: S&C Electric Company, Chicago, IL (US)

(72) Inventors: Thomas Olin Fanta, Wauconda, IL (US); Tsvetan Rusev, Morton Grove, IL (US); Adam Gardner, Chicago, IL (US)

(73) Assignee: S&C Electric Company, Chicago, IL (US)

( * ) Notice: Subject to any disclaimer, the term of this patent is extended or adjusted under 35 U.S.C. 154(b) by 55 days.

(21) Appl. No.: 17/963,874

(22) Filed: Oct. 11, 2022

(65) Prior Publication Data

US 2023/0141161 A1 May 11, 2023

Related U.S. Application Data

(60) Provisional application No. 63/278,217, filed on Nov. 11, 2021.

(51) Int. Cl.

| | |
|---|---|
| ***H01H 3/60*** | (2006.01) |
| ***H01H 33/664*** | (2006.01) |
| ***H01H 33/666*** | (2006.01) |

(52) U.S. Cl.

CPC ............ *H01H 33/664* (2013.01); *H01H 3/60* (2013.01); *H01H 33/6664* (2013.01); *H01H 2033/6648* (2013.01)

(58) Field of Classification Search

CPC ............. H01H 33/6664; H01H 33/664; H01H 33/662; H01H 2033/6623;

(Continued)

(56) References Cited

U.S. PATENT DOCUMENTS 2,539,175 A 1/1951 Balentine
8,040,210 B2 * 10/2011 Kim .................... H01H 33/666 335/266

(Continued)

FOREIGN PATENT DOCUMENTS

CN 201638741 U 11/2010
CN 106128852 A * 11/2016 ........... H01H 33/664

(Continued)

OTHER PUBLICATIONS

Translation of CN106128852 (Original document published Nov. 16, 2016) (Year: 2016).*

(Continued)

*Primary Examiner* — William A Bolton

(57) ABSTRACT

An anti-bounce dampener assembly for dampening the closing impact force between vacuum interrupter contacts. The dampener assembly includes a dampening spring positioned within a contact adapter, a guide tube extending through the contact adapter and the spring, where the guide tube is coupled to a fixed contact stem, and a bolt extending through the guide tube and being rigidly secured to the fixed contact stem. An impact force caused when the vacuum interrupter contacts contact each other when the vacuum interrupter is closed causes the fixed contact stem, the guide tube, the bolt and the vacuum interrupter to move against the bias of the spring and dampen the impact force. A flexible strap is electrically coupled to the fixed contact stem and the contact adapter, and flexes when the stem moves so as to maintain electrical coupling between the fixed contact stem and the contact adapter.

16 Claims, 3 Drawing Sheets

(58) Field of Classification Search
CPC ......... H01H 2033/6648; H01H 3/3015; H01H 3/60; H01H 1/502; H01H 33/38
USPC ............... 218/140, 134, 138, 139, 155, 124; 200/288
See application file for complete search history.

(56) References Cited

U.S. PATENT DOCUMENTS

| | | | | |
|---|---|---|---|---|
| 8,497,446 | B1 * | 7/2013 | Glaser | H01H 33/664 218/136 |
| 10,170,255 | B1 * | 1/2019 | Glaser | H01H 33/168 |
| 10,923,304 | B1 * | 2/2021 | Juds | H01H 51/01 |
| 2004/0232113 | A1 * | 11/2004 | Kynast | H01H 33/662 218/136 |
| 2012/0312667 | A1 * | 12/2012 | Hasegawa | H01H 3/60 200/288 |

FOREIGN PATENT DOCUMENTS

| | | | |
|---|---|---|---|
| JP | 05325741 | A | 12/1993 |
| KR | 10-1013668 | B1 | 2/2011 |

OTHER PUBLICATIONS

International Search Report and Written Opinion for International Application No. PCT/US2022/046310 dated Feb. 13, 2023. (9 pages).

* cited by examiner

VACUUM INTERRUPTER ANTI-BOUNCE DAMPENER

CROSS-REFERENCE TO RELATED APPLICATION

This application claims the benefit of priority from the U.S. Provisional Application No. 63/278,217, filed on Nov. 11, 2021, the disclosure of which is hereby expressly incorporated herein by reference for all purposes.

BACKGROUND

Field

This disclosure relates generally to an anti-bounce dampener assembly for dampening the closing impact force between vacuum interrupter contacts and, more particularly, to an anti-bounce dampener assembly for dampening the closing impact force between vacuum interrupter contacts, where the dampener assembly includes a moving guide tube and a dampening spring.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three phase feeders including three single phase feeder lines that carry the same current but are 120° apart in phase. three phase and single phase lateral lines are tapped off of the feeder that provide the medium voltage to various distribution transformers, where the voltage is stepped down to a low voltage and is provided to loads, such as homes, businesses, etc. Power distribution networks of the type referred to above typically include switching devices, breakers, reclosers, interrupters, etc. that control the flow of power throughout the network.

Periodically, faults occur in the distribution network as a result of various things, such as animals touching the lines, lightning strikes, tree branches falling on the lines, vehicle collisions with utility poles, etc. Faults may create a short-circuit that increases the stress on the network, which may cause the current flow to significantly increase, for example, many times above the normal current, along the fault path. This amount of current causes the electrical lines to significantly heat up and possibly melt, and also could cause mechanical damage to various components in the network. These faults are often transient or intermittent faults as opposed to a persistent or bolted fault, where the thing that caused the fault is removed a short time after the fault occurs, for example, a lightning strike. In such cases, the distribution network will almost immediately begin operating normally after a brief disconnection from the source of power.

A vacuum interrupter is a switch that employs opposing contacts, one fixed and one movable, positioned within a vacuum enclosure. When the vacuum interrupter is opened by moving the movable contact away from the fixed contact to prevent current flow through the interrupter a plasma arc is created between the contacts that is quickly extinguished by the vacuum, where metal vapor is emitted from the contacts. The separated contacts in vacuum provide dielectric strength that exceeds power system voltage and prevents current flow. The vacuum interrupter housing supports the contact structures and is an insulator, typically ceramic, to provide dielectric strength.

Fault interrupters, for example, single phase self-powered reclosers that employ vacuum interrupters and magnetic actuators, are provided on utility poles and in underground circuits along a power line and have a switch to allow or prevent power flow downstream of the recloser. These reclosers typically detect the current and/or voltage on the line to monitor current flow and have controls that indicate problems with the network circuit, such as detecting a high current fault event. If such a high fault current is detected the recloser is opened in response thereto, and then after a short delay closed to determine whether the fault is a transient fault. If high fault current flows when the recloser is closed after opening, it is immediately re-opened. If the fault current is detected a second time, or multiple times, during subsequent opening and closing operations indicating a persistent fault, then the recloser remains open, where the time between detection tests may increase after each test.

The magnetic actuator used in these types of reclosers typically have an armature or plunger that is moved by an electrical winding wound on a stator to open and close the vacuum interrupter contacts, where the plunger and the stator provide a magnetic path for the magnetic flux produced by the winding, and where the plunger is rigidly fixed to the movable contact by a drive rod. In one design, when the actuator is controlled to close the vacuum interrupter, the winding is energized by current flow in one direction, which causes the plunger to move and seat against a latching plate. The current is then turned off to de-energize the coil and permanent magnets hold the plunger against the latching plate and against a compression force of an opening spring. When the actuator is controlled to open the vacuum interrupter, the winding is energized by current flow in the opposite direction, which breaks the latching force of the permanent magnets and allows the opening spring to open the vacuum interrupter. A compliance spring is provided in addition to the opening spring to provide an additional opening force at the beginning of the opening process so as to break the weld on the interrupter contacts.

When the movable contact impacts the fixed contact at high speed during closing of the vacuum interrupter it will often bounce off of the fixed contact for a brief time period, for example two milliseconds, creating a gap therebetween. This contact bounce between the contacts of the vacuum interrupter can cause arcing and welding between the movable and fixed contacts, which results in higher forces required to open the vacuum interrupter, and in extreme cases may prevent opening of the vacuum interrupter contacts completely. Efforts to reduce contact bounce by dampening of the moving contact of the vacuum interrupter is limited by the stiffness of the compliance spring employed in the actuator.

SUMMARY

The following discussion discloses and describes an anti-bounce dampener assembly for dampening the closing impact force between vacuum interrupter contacts in a vacuum interrupter assembly. The vacuum interrupter assembly includes an outer housing, a contact adapter positioned within an opening in the housing and a vacuum interrupter positioned within the housing, where the vacuum interrupter includes an insulator having a first end and a second end, a first end cap sealed to the first end of the insulator and a second end cap sealed to the second end of the insulator. The vacuum interrupter assembly also includes a fixed contact stem positioned within the vacuum interrupter and including a first shaft coupled to the first end cap and a first contact and a movable contact stem positioned within the vacuum interrupter and including a second shaft connected to the second end cap by a flexible bellows and a second contact. The dampener assembly includes a dampening spring positioned within the contact adapter, a guide tube extending through the contact adapter and the dampening spring, where the guide tube is coupled to the fixed contact stem, and a bolt extending through the guide tube and being rigidly secured to the fixed contact stem. An impact force caused when the second contact impacts the first contact when the vacuum interrupter is closed causes the fixed contact stem, the guide tube, the bolt and the vacuum interrupter to move against the bias of the dampening spring and dampen the impact force. A flexible strap is electrically coupled to the fixed contact stem and the contact adapter, and flexes when the fixed contact stem moves so as to maintain electrical coupling between the fixed contact stem and the contact adapter.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to an anti-bounce dampener assembly for dampening the closing impact force between vacuum interrupter contacts is merely exemplary in nature, and is in no way intended to limit the disclosure or its applications or uses.

Figure 1:
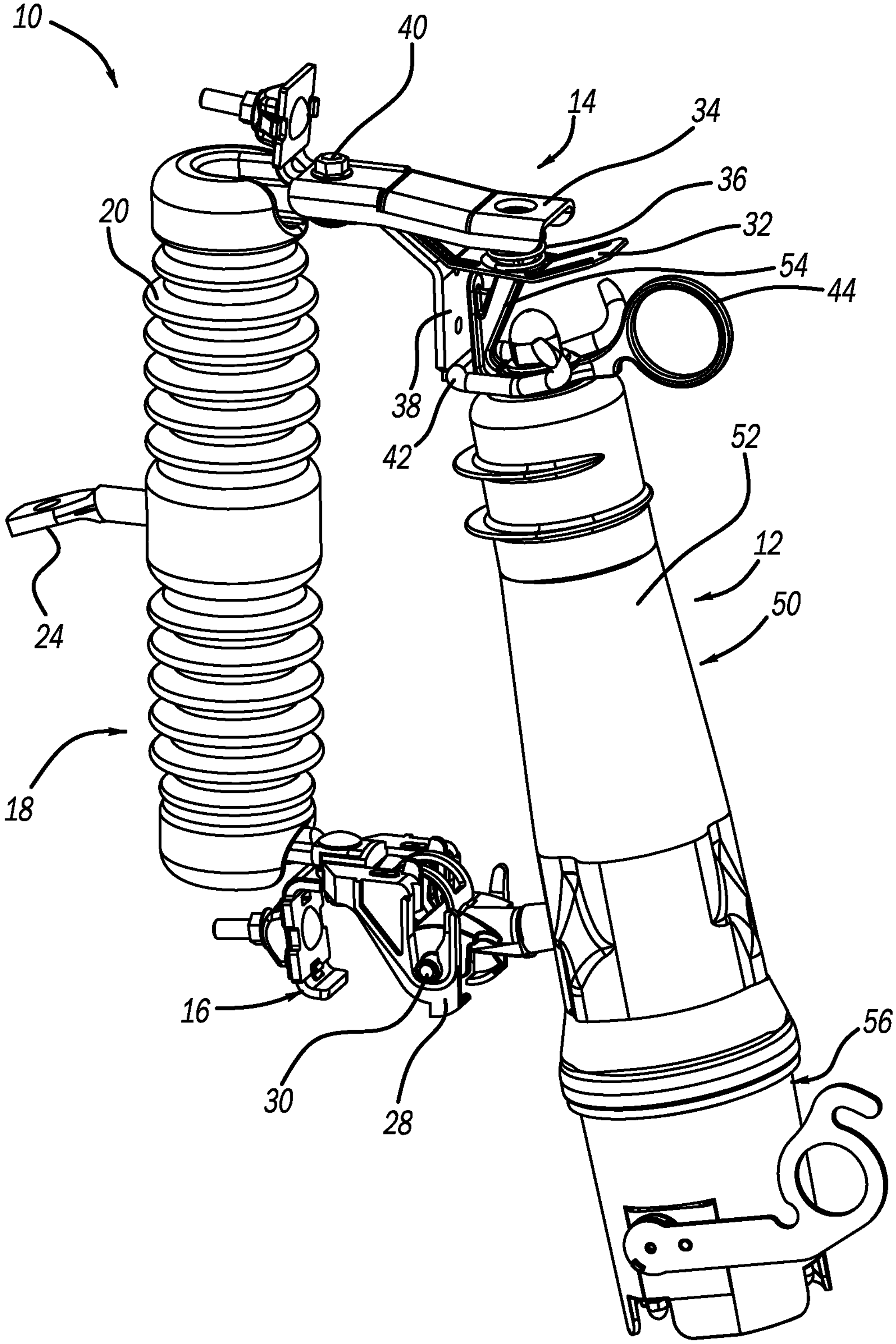
FIG. 1 is an isometric view of a switch assembly connected to a pole mounted insulator and including a single phase self-powered magnetically actuated switching device.

FIG. 1 is an isometric view of a pole mounted switch assembly 10 including a single phase self-powered magnetically actuated switching device 12 intended to represent any switching device suitable for the purposes discussed herein. The switching device 12 is coupled to an upper contact assembly 14 at one end and a mounting hinge 16 at an opposite end. The contact assembly 14 is secured to one end of an insulator 18 having skirts 20 and the mounting hinge 16 is secured to an opposite end of the insulator 18, where the insulator 18 is mounted to a bracket 24 that may be attached to a utility pole (not shown). The mounting hinge 16 includes a channel catch 28 that accepts a trunnion rod 30 coupled to the device 12 and that is electrically coupled to a unit bottom contact (not shown). The contact assembly 14 includes a top mounting tab 32, an extension tab 34 and a spring 36 positioned between the tabs 32 and 34. The contact assembly 14 also includes a support tab 38 bolted to the extension tab 34 by a bolt 40 and a pair of mounting horns 42 coupled to and extending from the support tab 38 opposite to the extension tab 34. A guiding pull ring member 44 is coupled to a top of the device 12 and allows a worker to easily install and remove the device 12 from the utility pole by pulling on the ring member 44 to disconnect the device 12 from the contact assembly 14, rotating the device 12 outward on the trunnion rod 30 and then lifting the device 12 out of the catch 28.

The switching device 12 includes a vacuum interrupter assembly 50 having an outer insulation housing 52 that encloses a vacuum interrupter (see FIGS. 2 and 3) of the type referred to above, where the vacuum interrupter assembly 50 is representative of any vacuum interrupter assembly known in the art for medium voltage uses that is suitable for the purposes discussed herein. More particularly, the vacuum interrupter defines a vacuum chamber that encloses a fixed contact that is electrically coupled to a unit top contact 54 and a movable contact that is electrically coupled to the unit bottom contact, where the fixed and movable contacts are in contact with each other within the vacuum chamber when the vacuum interrupter is closed. When the vacuum interrupter is opened by moving the movable contact away from the fixed contact the arc that is created between the contacts is extinguished by the vacuum at a zero current crossing. The switching device 12 also includes an enclosure 56 that encloses a magnetic actuator or other device that opens and closes the vacuum interrupter, various electronics, controllers, energy harvesting devices, sensors, communications devices, etc. consistent with the discussion herein.

Figure 2:
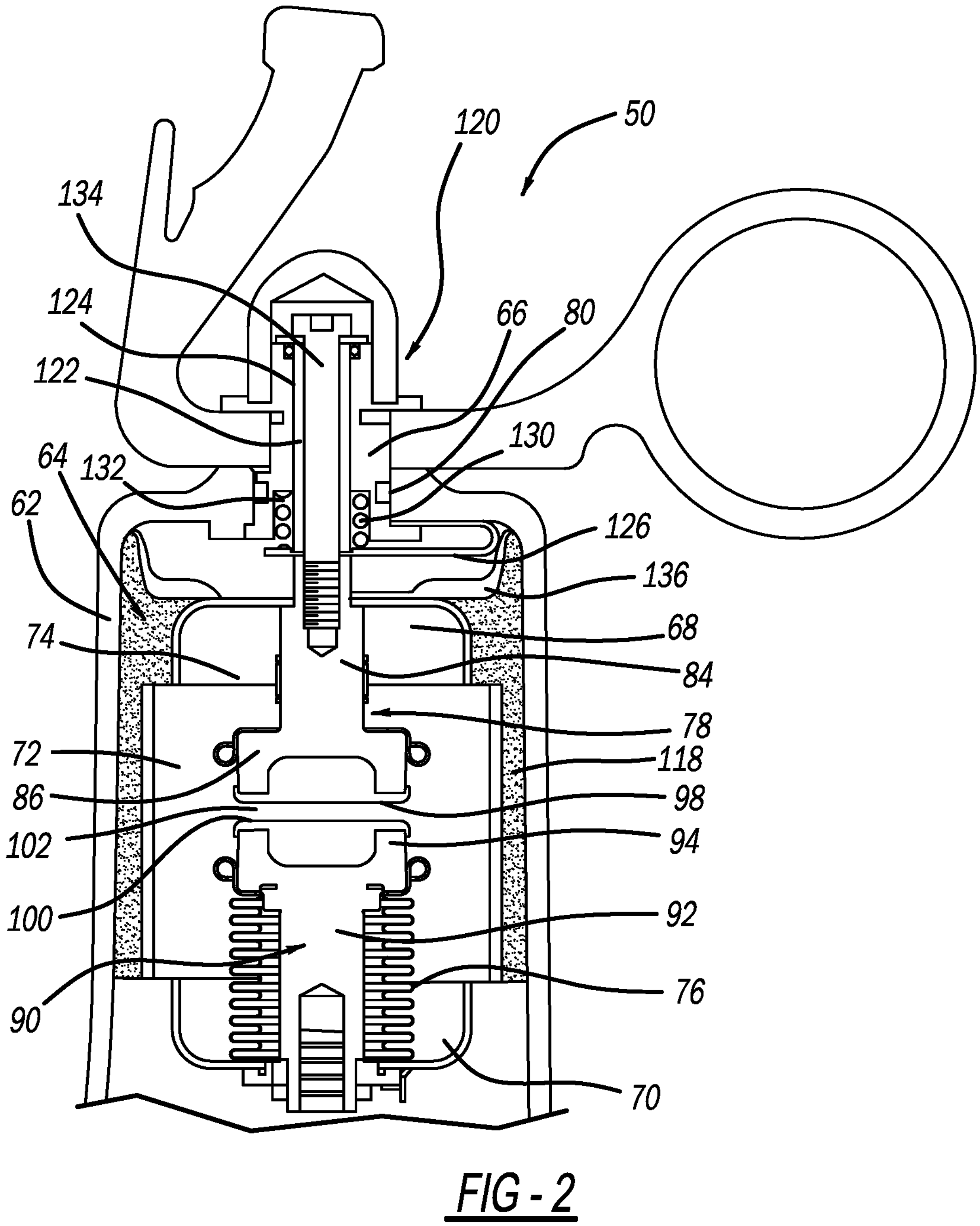
FIG. 2 is a cross-sectional type view of a vacuum interrupter assembly separated from the switching device that includes an anti-bounce dampener assembly for dampening vacuum interrupter contacts.
Figure 3:
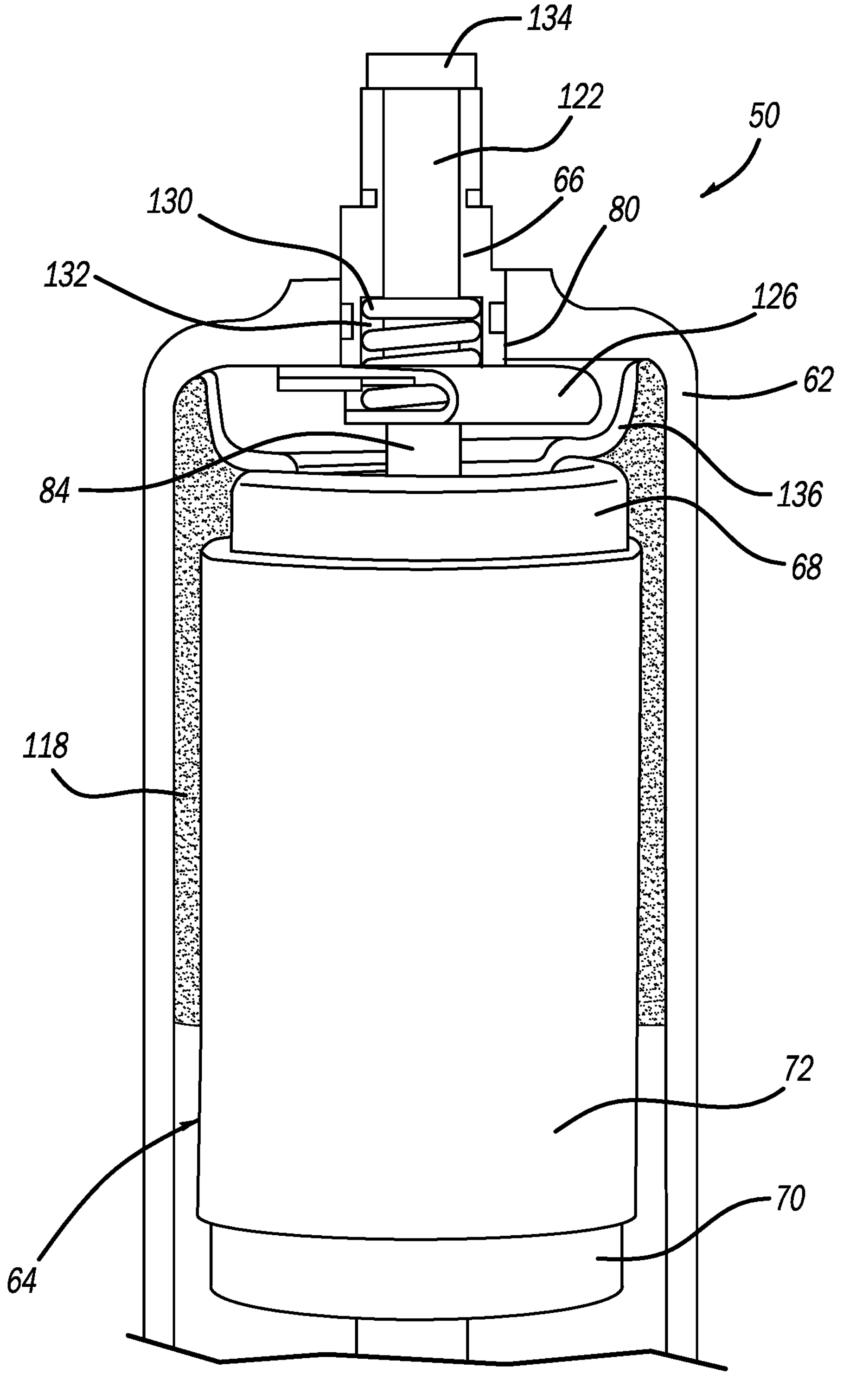
FIG. 3 is a broken-away view of the vacuum interrupter assembly shown in FIG. 2.

FIG. 2 is a cross-sectional type view and FIG. 3 is a broken-away view of the vacuum interrupter assembly 50. The vacuum interrupter assembly 50 includes an outer insulation housing 62 enclosing a vacuum interrupter 64 having a top metallic end cap 68, a bottom metallic end cap 70 and a cylindrical ceramic insulator 72 extending between and being sealed to the end caps 68 and 70 to define a vacuum chamber 74. A top contact adapter 66 is formed to an opening 80 in the housing 62. A metallic bellows 76 is electrically coupled to the end cap 70 and is positioned within the chamber 74. A fixed contact stem 78 is brazed and electrically coupled to the end cap 68 and extends through the end cap 68 into the chamber 74, where the stem 78 includes a shaft portion 84 and a cup portion 86. Likewise, a movable contact stem 90 electrically connected to, for example, a drive rod (not shown) coupled to an actuator (not shown) is electrically coupled and sealed to the bellows 76 and extends through the bellows 76 into the chamber 74, where the stem 90 includes a shaft portion 92 and a cup portion 94, and where the bellows 76 maintains the vacuum within the chamber 74 when the stem 90 moves. An arcing contact 98 is electrically secured to the cup portion 86 and an arcing contact 100 is electrically secured to the cup portion 94 so that a gap 102 is defined therebetween when the vacuum interrupter 64 is open, as shown. A viscous high dielectric insulation medium 118 is provided around the vacuum interrupter 64 to provide dielectric strength. When the vacuum interrupter 64 is closed, the contacts 98 and 100 are held in contact with each other under spring bias (not shown) and when the vacuum interrupter 64 is opened, the stem 90 moves the contact 100 away from the contact 98, thus creating a plasma arc that is interrupted at the next zero current crossing due to the current interrupting capability of the vacuum.

The vacuum interrupter assembly 50 also includes an anti-bounce dampener assembly 120 for dampening and reducing the contact bounce between the contacts 98 and 100 when the vacuum interrupter 64 is closed. The dampener assembly 120 includes a moving metal guide tube 122 positioned within a bore 124 extending through the contact adapter 66. The dampener assembly 120 also includes a flexible conductive strap 126 having one end positioned between the guide tube 122 and the shaft portion 84 of the stem 78 and an opposite end positioned between the housing 62 and the adapter 66 so as to provide a current path between the stem 78 and the adapter 66. A preloaded dampener spring 130 is positioned within a bore 132 in the adapter 66 and is pressed against the end of the strap 126 in contact with the stem 78. A mounting bolt 134 extends through the guide tube 122, the spring 130 and the strap 126 and is threaded into the shaft portion 84 of the stem 78 to secure the assembly 120 together. A sealing cup 136 prevents the insulation medium 118 from getting into the dampener assembly 120.

When the vacuum interrupter 64 closes and the contact 100 impacts the contact 98, the stem 78 is forced upward against the bias of the spring 130, which causes the guide tube 122 and the mounting bolt 134 to move in the adapter 66. Since the stem 78 is rigidly fixed to the end cap 68, the entire vacuum interrupter 64 also moves upward against the bias of the spring 130, where this movement of the vacuum interrupter 64 is then stabilized by the spring 130. Particularly, the dampening spring's pre-load force has adequate margin over the highest compliance spring force in order to provide a stable fixed position prior to and after impact deflection. Thus, the movement of the mass of the vacuum interrupter 64 and associated components when the contact 100 impacts the contact 98 reduces or dampens the bounce of the contact 100 off of the contact 98. Additionally, when the vacuum interrupter 64 moves, a shear force is created in the insulation medium 118, which also operates to dampen the impact between the contacts 98 and 100.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A vacuum interrupter assembly comprising:

an outer housing;

a contact adapter positioned within an opening in the housing;

a vacuum interrupter positioned within the housing, the vacuum interrupter including an insulator having a first end and a second end, a first end cap sealed to the first end of the insulator and a second end cap sealed to the second end of the insulator;

a fixed contact stem positioned within the vacuum interrupter and including a first shaft coupled to the first end cap and a first contact;

a movable contact stem positioned within the vacuum interrupter and including a second shaft connected to the second end cap by a flexible bellows and a second contact;

a dampening spring positioned within the contact adapter;

a guide tube extending through the contact adapter and the dampening spring, the guide tube being coupled to the fixed contact stem;

a bolt extending through the guide tube and being rigidly secured to the fixed contact stem, wherein an impact force caused when the second contact impacts the first contact when the vacuum interrupter is closed causes the fixed contact stem, the guide tube, the bolt and the vacuum interrupter to move against a bias of the dampening spring and dampen the impact force;

a flexible strap electrically coupled to the fixed contact stem and the contact adapter, the flexible strap flexing when the vacuum interrupter moves so as to maintain electrical coupling between the vacuum interrupter and the contact adapter;

an insulating medium provided between the outer housing and the vacuum interrupter, wherein a shear force on the medium when the vacuum interrupter moves provides additional dampening of the impact force; and a sealing cup positioned within the outer housing and preventing the insulating medium from contacting the contact adapter and the dampening spring.

2. The vacuum interrupter assembly according to claim 1 wherein the insulator is a ceramic insulator.

3. The vacuum interrupter assembly according to claim 1 wherein the vacuum interrupter assembly is part of a medium voltage distribution network.

4. The vacuum interrupter assembly according to claim 3 wherein the vacuum interrupter assembly is part of a self-powered magnetically actuated recloser.

5. A vacuum interrupter assembly comprising:

an outer housing;

a contact adapter positioned within an opening in the housing;

a vacuum interrupter positioned within the housing, the vacuum interrupter including an insulator having a first end and a second end, a first end cap sealed to the first end of the insulator and a second end cap sealed to the second end of the insulator;

a fixed contact stem positioned within the vacuum interrupter and including a first shaft coupled to the first end cap and a first contact;

a movable contact stem positioned within the vacuum interrupter and including a second shaft connected to the second end cap by a flexible bellows and a second contact;

a dampening spring positioned within the contact adapter;

a guide tube extending through the contact adapter and the dampening spring, the guide tube being coupled to the fixed contact stem;

a bolt extending through the guide tube and being rigidly secured to the fixed contact stem, wherein an impact force caused when the second contact impacts the first contact when the vacuum interrupter is closed causes the fixed contact stem, the guide tube, the bolt and the vacuum interrupter to move against a bias of the dampening spring and dampen the impact force;

an insulating medium provided between the outer housing and the vacuum interrupter, wherein a shear force on the medium when the vacuum interrupter moves provides additional dampening of the impact force;

a flexible strap electrically coupled to the fixed contact stem and the contact adapter, the flexible strap flexing when the fixed contact stem moves so as to maintain electrical coupling between the fixed contact stem vacuum interrupter and the contact adapter; and, a sealing cup positioned within the outer housing and preventing the insulating medium from contacting the contact adapter and the dampening spring.

6. The vacuum interrupter assembly according to claim 5 wherein the insulator is a ceramic insulator.

7. The vacuum interrupter assembly according to claim 5 wherein the vacuum interrupter assembly is part of a medium voltage distribution network.

8. The vacuum interrupter assembly according to claim 7 wherein the vacuum interrupter assembly is part of a self-powered magnetically actuated recloser.

9. An anti-bounce dampener assembly for dampening a closing impact force between vacuum interrupter contacts in a vacuum interrupter in a vacuum interrupter assembly, the dampener assembly comprising:

a dampening spring positioned within a contact adapter that is positioned within an opening in an outer housing of the vacuum interrupter assembly;

a guide tube extending through the contact adapter and the dampening spring, the guide tube being coupled to a fixed contact stem of the vacuum interrupter; and a bolt extending through the guide tube and being rigidly secured to the fixed contact stem, wherein an impact force caused when the vacuum interrupter contacts impact when the vacuum interrupter is closed causes the fixed contact stem, the guide tube, the bolt and the vacuum interrupter to move against a bias of the dampening spring and dampen the impact force;

a flexible strap electrically coupled to the fixed contact stem and the contact adapter, the flexible strap flexing when the vacuum interrupter moves so as to maintain electrical coupling between the vacuum interrupter and the contact adapter;

an insulating medium provided between the outer housing and the vacuum interrupter, wherein a shear force on the medium when the vacuum interrupter moves provides additional dampening of the impact force; and, a sealing cup positioned within the outer housing and preventing the insulating medium from contacting the contact adapter and the dampening spring.

10. The dampener assembly according to claim 9 wherein the vacuum interrupter assembly is part of a medium voltage distribution network.

11. The dampener assembly according to claim 10 wherein the vacuum interrupter assembly is part of a self-powered magnetically actuated recloser.

12. A vacuum interrupter assembly comprising:

an outer housing;

a contact adapter positioned within an opening in the housing;

a vacuum interrupter positioned within the housing, the vacuum interrupter including an insulator having a first end and a second end, a first end cap sealed to the first end of the insulator and a second end cap sealed to the second end of the insulator;

a fixed contact stem positioned within the vacuum interrupter and including a first shaft coupled to the first end cap and a first contact;

a movable contact stem positioned within the vacuum interrupter and including a second shaft connected to the second end cap by a flexible bellows and a second contact;

a dampening spring positioned within the contact adapter;

a guide tube extending through the contact adapter and the dampening spring, the guide tube being coupled to the fixed contact stem; and a bolt extending through the guide tube and being rigidly secured to the fixed contact stem, wherein an impact force caused when the second contact impacts the first contact when the vacuum interrupter is closed causes the fixed contact stem, the guide tube, the bolt and the vacuum interrupter to move against a bias of the dampening spring and dampen the impact force;

an insulating medium provided between the outer housing and the vacuum interrupter, wherein a shear force on the medium when the vacuum interrupter moves provides additional dampening of the impact force; and a sealing cup positioned within the outer housing and preventing the insulating medium from contacting the contact adapter and the dampening spring.

13. The vacuum interrupter assembly of claim 12 further comprising a flexible strap electrically coupled to the fixed contact stem and the contact adapter, the flexible strap flexing when the vacuum interrupter moves so as to maintain electrical coupling between the vacuum interrupter and the contact adapter.

14. The vacuum interrupter assembly according to claim 12 wherein the insulator is a ceramic insulator.

15. The vacuum interrupter assembly according to claim 12 wherein the vacuum interrupter assembly is part of a medium voltage distribution network.

16. The vacuum interrupter assembly according to claim 15 wherein the vacuum interrupter assembly is part of a self-powered magnetically actuated recloser.

* * * * *